Figure 1:
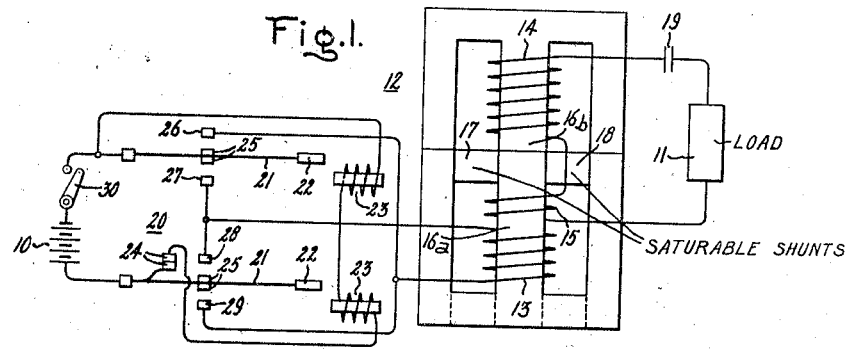

Sept. 14, 1943.  T. T. SHORT  2,329,224
ELECTRIC TRANSLATING APPARATUS
Filed June 26, 1942

Inventor:
Thomas T. Short,
by Harry E. Dunham
His Attorney.

Patented Sept. 14, 1943

2,329,224

UNITED STATES PATENT OFFICE 2,329,224

ELECTRIC TRANSLATING APPARATUS

Thomas T. Short, Fort Wayne, Ind., assignor to General Electric Company, a corporation of New York Application June 26, 1942, Serial No. 448,567

6 Claims. (Cl. 175—365)

My invention relates to electric translating apparatus and more particularly to translating apparatus for supplying alternating current to a load circuit from a direct current supply.

Many arrangements including mechanical switching means have been devised for converting direct current to alternating current of a higher voltage for supplying electrical loads such as, for example, fluorescent lamps. These arrangements have been used to advantage in lighting systems for vehicles such as busses and railway cars. One such arrangement is disclosed and claimed in Lord Patent 2,310,741, dated February 9, 1943, and assigned to the assignee of the present invention. In the system described in the Lord patent, a high reactance transformer having saturable shunts between the primary and secondary windings is utilized in combination with a capacitor and vibratory switching means to effect the transfer of current from a direct current supply circuit to an alternating current load circuit, such as a fluorescent lamp, in which the transformer and capacitor cooperate to produce extended periods of substantially zero current between each half cycle of load current during which the switching means may be operated without sparking. The present invention is in the nature of an improvement on the arrangement disclosed in the above identified Lord application and includes improved means for insuring sparkless operation of the switching means. More specifically, a magnetomotive force dependent upon the secondary current is introduced in the magnetic circuit of the primary to control the current in the primary circuit during operation of the switching means. This improvement is particularly advantageous where supply circuit voltage fluctuates considerably.

It is an object of my invention to provide new and improved electric translating apparatus.

It is another object of my invention to provide electric translating apparatus for effecting the transfer of energy from a direct current supply circuit to an alternating current load circuit through periodically operated mechanical switching means which is characterized by sparkless operation of the switching means during varying operating conditions of the translating apparatus.

In accordance with the illustrated embodiment of my invention alternating current is transferred from a direct current supply circuit to a load circuit by electric translating apparatus including a transformer having a primary winding, a secondary winding and a compensating winding. The core structure of the transformer includes saturable shunts which are located between the primary and secondary windings and constructed to saturate at an early point in the alternating current wave. A condenser associated with the secondary winding is designed to tune the primary circuit to substantially the frequency of the current to be supplied to the alternating current load circuit and cooperates with the reactance of the transformer to provide a period of low current at each end of each half cycle of alternating current. Means for periodically energizing the primary winding from the direct current source or battery is provided by a mechanical switch of the vibratory type which interconnects the primary winding and the battery. The compensating winding is connected in series circuit relation with the secondary winding and closely coupled with the primary winding to provide means for maintaining the period of low current in the primary circuit under varying operating conditions, such as voltage fluctuations in the supply circuit.

My invention will be better understood by reference to the following description taken in connection with the accompanying drawing and its scope will be pointed out in the appended claims. In the drawing, Fig. 1 is a schematic representation of one embodiment of my invention and Fig. 2 is a schematic representation of a modification.

Figure 2:
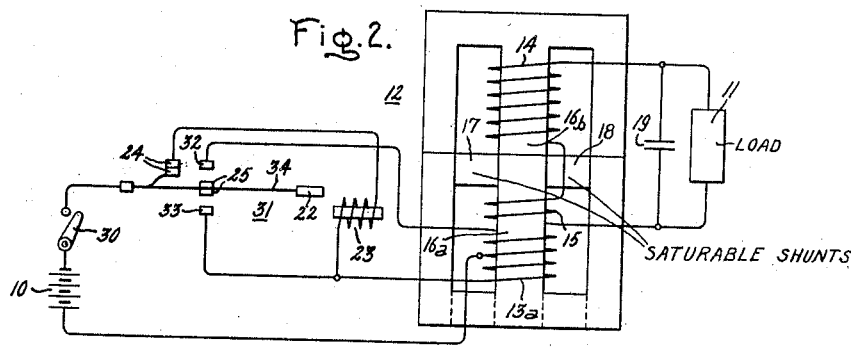

Referring now to Fig. 1 of the drawing, I have shown my invention embodied in electric translating apparatus for supplying energy from a direct current supply, such as a battery 10, to an alternating current load circuit 11, which may be electric discharge devices, such as fluorescent lamps. The electric translating apparatus includes a transformer 12 having a primary winding 13, a secondary winding 14 and a compensating winding 15. The transformer 12 may comprise a three-legged core structure having intermediate leg sections 16a and 16b on which the windings 13, 14 and 15 are wound. Saturable sections or shunts 17 and 18 are arranged between winding 14 and windings 13 and 15. These shunts are designed to saturate when the current in the primary reaches a relatively small percentage of the amplitude of the alternating current. Windings 13 and 15 are wound on the leg section 16b and may be considered closely coupled and these two windings are loosely coupled with the winding 14 which is wound on leg section 16a. The transformer is preferably a step-up transformer with the compensating winding 15 comprising a very small number of turns relative to the total number of secondary turns. As illustrated in the drawing, the upper portion of the core structure including the winding leg 16b is formed of E-shaped punchings all stacked in the same direction. The lower portion of the core including the winding leg portion 16a is formed of E punchings most of which are stacked one way with the leg portions of the E punchings abutting and in alignment with the leg portions of the upper portion of the core. A certain number of the punchings of the lower portion of the core are reversed so that the base portions thereof provide the saturable shunts 17 and 18. This particular construction provides a simple core structure and at the same time provides a butt joint between the upper and lower sections of the core. The butt joint is effectively a small nonmagnetic gap in the local magnetic circuit of the secondary winding and maintains the magnetizing impedance of the secondary winding relatively low when the circuit of the primary winding is open for a purpose which will become more apparent as the description proceeds.

The secondary winding 14 and the compensating winding 15 are connected in series and to the load circuit 11 through a series capacitor 19. The primary winding is connected to be energized periodically with direct current voltage impulses of opposite polarity from the battery 10 by vibratory switching means of the reversing type designated generally by the number 20. The switching means may be of any of the types well known in the art and, as illustrated, comprises a pair of vibratory elements or reeds 21 having armature portions 22 arranged in cooperative relation with electromagnets 23 which are energized in series from the direct current supply circuit through a pair of relatively movable contacts 24 operated in accordance with the movement of the reeds 21. The reeds are preferably mechanically connected together to insure in-phase operation thereof and as will be apparent are necessarily maintained in electrically insulated relation when connected as illustrated in Fig. 1. Each of the reeds carries a pair of movable contacts 25 which are arranged to engage alternately the contacts 26 and 27, and 28 and 29. A manually operated starting switch 30 is connected in circuit with the battery 10. The vibratory elements of the switching means are preferably mechanically tuned to substantially the frequency at which it is desired that they operate in order to minimize the mechanical force required to maintain uniform vibration thereof. The value of the capacitor 19 is chosen with respect to the other constants of the circuit so that the circuit of the primary winding 13 of the transformer is tuned to substantially the frequency of the alternating current to be supplied to the load circuit 11 and the frequency of operation of the switching means 20. Inasmuch as the saturable shunt 18 introduces a nonlinearity in the transformer circuit, it will be understood that when the shunts are saturated the circuit is tuned to one frequency and when it is unsaturated the circuit is tuned to a much lower frequency or viewed from another aspect, the condenser can be considered to tune the primary circuit to a frequency slightly higher than the frequency of operation of the switching means when the shunts are saturated. When they are unsaturated the impedance rises and the current is maintained at a low value for a considerable interval of time between successive half cycles of current during which sparkless switching may be accomplished.

A brief consideration of the operation of the circuit will serve to bring out the features and advantages of the present invention. If initiating switch 30 is closed the electromagnetic operating means 23 are energized through a circuit from the direct current supply 10 and through the relatively movable contacts 24. The reeds are moved downwardly into engagement with the contacts 27 and 29 to energize the primary windings 13 of the transformer with a direct current voltage of one polarity. This initiates a transient current flow in the primary winding which builds up slowly at first due to the low reluctance of the leakage magnetic circuit including the saturable shunts which are at this time unsaturated. At a predetermined value of primary current the shunts become saturated and the coupling of the primary and secondary windings is increased. The current builds up at a rate determined by the tuning of the transformer accomplished by the capacitor 19 and is approximately sinusoidal in character. When the current is reduced to a low value again the shunts begin to become unsaturated to cause an extended period of substantially zero current in the primary circuit during which the contacts of the switch may be opened without sparking.

Variations in operating conditions, such as supply voltage fluctuations or fluctuations in load, may cause the primary current to start to rise before the switch contacts open. In accordance with an important feature of the present invention I provide means for opposing the rise in current at the end of the commutating period by means of a commutating or compensating winding closely coupled with the primary winding and connected to conduct the secondary current. In this connection it should be noted that when the primary circuit is reduced to zero, the energy stored in condenser 19 is effective to reverse the current in the secondary circuit. When, as illustrated, the portion of the core structure on which the secondary winding is wound is formed of E punchings which are separated from the remainder of the core by a butt joint which forms a small nonmagnetic gap, the magnetizing impedance of the secondary winding is low so that considerable current may be maintained through the secondary winding by the capacitor. This current maintained by the capacitor is the reverse of the current which has been flowing to charge the condenser and is in the direction of the current which is to flow during the next half cycle. The compensating winding carrying the secondary current is wound in closely coupled relation with the primary winding to produce a magnetomotive force opposing the build-up of primary current. This has been found to provide very effective means of minimizing sparking under considerable fluctuations in load or supply voltage. When the elements 21 move the contacts 25 into engagement with contacts 27 and 29 the circuit of electromagnet 23 is interrupted and after an interval dependent upon the mechanical tuning of the vibratory elements the reeds move upwardly and bring contacts 25 into engagement with contacts 26 and 28. As the reeds move upwardly the movable contacts 24 are closed and the electromagnetic operating means 23 are again energized. The reeds 21 remain in the upper position to energize the transformer to provide another half cycle of flux in the core and then move away by the combined action of the reeds themselves or other spring means associated therewith and the operating means 23. It will be understood that this operation effects the periodic energization of the transformer with direct current impulses of opposite polarity to produce an alternating flux in the transformer core.

From the foregoing description it is believed apparent that the capacitor 19 cooperating with the nonlinear reactance of the circuit produces a period of low current at accurately spaced intervals and for predetermined duration. However, variations in load impedance or supply voltage tend to alter this period of low current so that it becomes difficult to maintain the operation of the switching sufficiently well synchronized with the period of low current to insure sparkless switching. By the use of the compensating winding, however, the effect on the primary current of these fluctuations is minimized. The action of the compensating winding may be said to predominate when the shunts are unsaturated and the capacitor is effectively loosely coupled with the primary circuit.

The arrangement shown in Fig. 2 is very similar to the arrangement just described in connection with Fig. 1 and the same reference numerals will be used to designate corresponding parts. In the arrangement shown in Fig. 2 the primary winding 13a is center tapped and reversal of flux in the transformer is produced by alternately energizing opposite halves of the transformer. To this end, the switching means 31 is provided with fixed contacts 32 and 33 which are connected, respectively, with the end terminals of the primary windings of the transformer. The intermediate terminal of the transformer is connected with one terminal of the direct current supply 10 while the other terminal of the direct current supply circuit is connected to the reed 34 of the vibratory switch through the initiating switch 30. While the condenser 19 may be connected as shown in Fig. 1, it is also possible to connect it in parallel with the secondary winding or as illustrated in Fig. 2 in parallel with the secondary winding and compensating winding in series. The capacitor 19 in parallel with the secondary circuit reflects as a series capacitor in the primary circuit and may be proportioned to tune the primary circuit to substantially the frequency of the operation of the switching means. As will be appreciated by those skilled in the art it is not advisable to operate an electric discharge device such as a fluorescent lamp, directly across a condenser so that it is desirable, in using the arrangement of Fig. 2 for supplying such a load, to connect a ballast impedance, such as a reactor, in series with the lamp. It is believed that the operation of the modification shown in Fig. 2 will be apparent from the detailed description of the operation of Fig. 1.

While I have shown and described particular embodiments of my invention, it will be obvious to those skilled in the art that changes and modifications may be made without departing from my invention in its broader aspects, and I, therefore, aim in the appended claims to cover all such changes and modifications as fall within the true spirit and scope of my invention.

What I claim as new and desire to secure by Letters Patent of the United States is:

1. In combination, a direct current supply circuit, an alternating current load circuit, electric translating apparatus interconnecting said circuits including transformer means having a primary winding, a secondary winding, a compensating winding and a core structure, said core structure including a saturable shunt arranged to provide a magnetic path between said secondary winding and said primary and compensating windings, switching means interconnecting said primary winding and said direct current supply circuit, means for operating said switching means to energize said primary winding with periodic voltage impulses, capacitance means connected in circuit with said secondary winding and cooperating with said saturable shunt to produce periods of low current at the periodicity of operation of said switching means, and means connecting said compensating winding to be energized in accordance with the current of said secondary winding to introduce a magnetomotive force in the magnetic circuit of said primary winding tending to prevent the rise of primary current during the operation of said switching means.

2. In combination, a direct current supply circuit, an alternating current load circuit, electric translating apparatus interconnecting said circuits including transformer means having a primary winding, a secondary winding, a compensating winding and a core structure, said core structure including a saturable portion arranged to provide a magnetic path between said secondary winding and said primary and said compensating windings so that said secondary winding is loosely coupled with the other of said windings when said saturable portions are unsaturated, capacitance means connected with said secondary winding for tuning the circuit of said primary to substantially the frequency of the alternating current to be supplied to said load circuit, switching means interconnecting said primary winding and said direct current supply circuit, means for effecting periodic operation of said switching means to energize the primary winding with periodic voltage impulses, and means including said compensating winding for introducing a magnetomotive force in the magnetic circuit of said primary winding during the interval that said saturable portions are unsaturated to control the current in said primary circuit.

3. In combination, a direct current supply circuit, an alternating current load circuit, electric translating apparatus interconnecting said circuits including transformer means having a primary winding, a secondary winding, a compensating winding and a core structure, said core structure including a saturable portion, and compensating winding being connected in series circuit relation with said secondary winding and wound in closely coupled relation with said primary winding, said saturable portion being constructed to saturate at a predetermined point in the cycle of primary current for varying the coupling between said secondary winding and said primary and said compensating windings, switching means interconnecting said primary winding and said direct current supply circuit and means for operating said switching means periodically to impress periodic voltage impulses on said primary winding, the intervals during which said saturable portions are unsaturated including the periods of operation of said switching means.

4. In combination, a direct current supply circuit, an alternating current load circuit, electric translating apparatus interconnecting said circuits including transformer means having a primary winding, a secondary winding, a compensating winding and a core structure, said windings being wound on said core structure to provide high flux leakage between said primary and secondary windings and to provide close coupling between said primary and said compensating windings, switching means interconnecting said primary winding and said direct current supply circuit, means for operating said switching means periodically to impress periodic voltage impulses on said primary winding, capacitance means connected in series with said secondary winding and cooperating with the reactance of said transformer to tune the circuit of the primary winding substantially to the frequency of operation of said switching means, means connecting said compensating winding for energization in accordance with the current conducted by said secondary winding, and means comprising said capacitance and said compensating winding for maintaining said primary current at a low value at the beginning and end of each half cycle to provide sparkless operation of said switching means.

5. In combination, a direct current supply circuit, an alternating current load circuit, electric translating apparatus interconnecting said circuits including transformer means having a primary winding, a secondary winding, a compensating winding and a substantially rectangular magnetic core including a saturable section extending between opposed sides of said rectangular core intermediate the ends of said sides, said primary winding and said compensating winding being wound on said rectangular core on one side of said shunt and said secondary winding being wound on said core on the other side of said shunt to provide high flux leakage between said primary and said secondary windings and to provide close coupling between said primary and said compensating windings, switching means interconnecting said primary winding and said direct current supply circuit, means for operating said switching means periodically to impress periodic voltage impulses on said primary winding, capacitance means connected in series with said secondary winding and cooperating with the reactance of said transformer to tune the circuit of the primary winding substantially to the frequency of operation of said switching means, means connecting said compensating winding for energization in accordance with the current conducted by said secondary winding, and means comprising said capacitance and said compensating winding for maintaining said primary current at a low value at the beginning and end of each half cycle to provide sparkless operation of said switching means.

6. In combination, a direct current supply circuit, an alternating current load circuit, electric translating apparatus interconnecting said circuits including transformer means comprising a core structure having two groups of E-shaped punchings arranged with the legs thereof in abutting relation, one of said groups having all of the punchings arranged one way and the other of said groups having a number of the punchings thereof reversed to provide saturable shunts extending between the intermediate leg and the outside legs of said core structure, a primary winding and a compensating winding wound on the central leg of said second set of punchings, a secondary winding wound on the intermediate leg of said first group of punchings, switching means interconnecting said primary winding and said direct current supply circuit, means for operating said switching means periodically to impress periodic voltage impulses on said primary winding, capacitance means connected in circuit with said secondary winding and cooperating with the reactance of said transformer to tune the circuit of the primary winding substantially to the frequency of operation of said switching means, means connecting said compensating winding for energization in accordance with the current conducted by said secondary winding, and means comprising said capacitance and said compensating winding for maintaining said primary current at a low value at the beginning and end of each half cycle substantially independently of supply circuit voltage fluctuations to provide sparkless operation of said switching means.

THOMAS T. SHORT.

CERTIFICATE OF CORRECTION.

Patent No. 2,329,224. September 14, 1943.

THOMAS T. SHORT.

It is hereby certified that error appears in the printed specification of the above numbered patent requiring correction as follows: Page 1, second column, line 20, for "windlng" read --winding--; page 3, second column, line 60, claim 3, for "and" read --said--; and that the said Letters Patent should be read with this correction therein that the same may conform to the record of the case in the Patent Office.

Signed and sealed this 9th day of November, A. D. 1943.

(Seal)

Henry Van Arsdale,
Acting Commissioner of Patents.